United States Patent
Umino et al.

(10) Patent No.: US 10,829,579 B2
(45) Date of Patent: Nov. 10, 2020

(54) ACTIVE-ENERGY-RAY-CURABLE AQUEOUS RESIN COMPOSITION AND UNDERCOAT AGENT FOR INORGANIC-MATERIAL THIN FILM

(71) Applicant: DIC Corporation, Tokyo (JP)

(72) Inventors: Akio Umino, Ichihara (JP); Hirotake Fukuoka, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 16/480,452

(22) PCT Filed: Jan. 18, 2018

(86) PCT No.: PCT/JP2018/001339
§ 371 (c)(1),
(2) Date: Jul. 24, 2019

(87) PCT Pub. No.: WO2018/139328
PCT Pub. Date: Aug. 2, 2018

(65) Prior Publication Data
US 2019/0382518 A1    Dec. 19, 2019

(30) Foreign Application Priority Data
Jan. 25, 2017    (JP) .................................. 2017-011187

(51) Int. Cl.
| C08F 2/46 | (2006.01) |
| C08F 2/50 | (2006.01) |
| C08G 61/04 | (2006.01) |
| C08F 283/02 | (2006.01) |
| C08F 20/18 | (2006.01) |
| C08F 20/20 | (2006.01) |
| C09D 133/10 | (2006.01) |

(52) U.S. Cl.
CPC ............ *C08F 283/02* (2013.01); *C08F 20/18* (2013.01); *C08F 20/20* (2013.01); *C09D 133/10* (2013.01)

(58) Field of Classification Search
CPC ........ C08F 283/02; C08F 20/18; C08F 20/20; C08F 287/00; C08F 299/06; C09D 133/10; C09D 133/00; C09D 5/00; C09D 151/08; C09D 167/08; B23B 27/30

USPC .................................................... 522/1; 520/1
See application file for complete search history.

(56) References Cited

U.S. PATENT DOCUMENTS

| 4,273,690 A | 6/1981 | Walus |
| 6,333,378 B1 | 12/2001 | Clark et al. |
| 2012/0083548 A1 | 4/2012 | Loeffler |
| 2014/0323646 A1* | 10/2014 | Matsunaga ............ C09D 11/03 524/543 |

FOREIGN PATENT DOCUMENTS

| JP | S56-061419 A | 5/1981 |
| JP | 2003-501499 A | 1/2003 |
| JP | 2005-131460 | * 5/2005 |
| JP | 2012-530156 A | 11/2012 |
| JP | 2015-013933 | * 1/2015 |
| JP | 2015-013933 A | 1/2015 |

OTHER PUBLICATIONS

Takigawa, JP 2005-131460 Machine Translation, May 26, 2005 (Year: 2005).*
Umino et al, JP 2015-013933 Machine Translation, Jan. 22, 2015 (Year: 2015).*
International Search Report dated Apr. 24, 2018, issued for PCT/JP2018/001339.

* cited by examiner

*Primary Examiner* — Jessica Whiteley
(74) *Attorney, Agent, or Firm* — Locke Lord LLP; James E. Armstrong, IV; Nicholas J. DiCeglie, Jr.

(57) ABSTRACT

Provided are an active-energy-ray-curable aqueous resin composition capable of providing excellent coating appearance and excellent adhesion to a substrate, an undercoat agent for an inorganic-material thin film produced using the same, and a molded article produced using the undercoat agent for an inorganic-material thin film. The active-energy-ray-curable aqueous resin composition includes an acryl-modified alkyd resin (A) and a (meth)acryloyl group-containing compound (B) as essential components. The undercoat agent for an inorganic-material thin film is produced using the composition, and the molded article is produced using the undercoat agent for an inorganic-material thin film.

8 Claims, No Drawings

ACTIVE-ENERGY-RAY-CURABLE AQUEOUS RESIN COMPOSITION AND UNDERCOAT AGENT FOR INORGANIC-MATERIAL THIN FILM

TECHNICAL FIELD

The present invention relates to an active-energy-ray-curable aqueous resin composition capable of providing excellent coating appearance and excellent adhesion to a substrate, an undercoat agent for an inorganic-material thin film produced using the same, and a molded article produced using the undercoat agent for an inorganic-material thin film.

BACKGROUND ART

For forming a portion having metallic luster in automotive parts, household appliances, cosmetic containers and the like, a technique of forming a thin film of an inorganic material, such as aluminum, tin, or silicon dioxide, by a method, such as vacuum deposition or sputtering, has been widely used. In the technique, for the purpose of improving the adhesion between a substrate and an inorganic-material thin film, or forming a smoother inorganic-material thin film to enhance the design properties, an undercoat layer is generally formed between the substrate and the inorganic-material thin film.

Among the automotive parts, in the parts required to have high heat resistance and impact resistance and be lightweight, such as a light reflector for exterior lamp lens, plastic substrates, such as a BMC (bulk molding compound), a PPS (polyphenylene sulfide), an ALD (aluminum die cast), a PBT (polybutylene terephthalate)/PET (polyethylene terephthalate) alloy resin, a PC (polycarbonate), an ABS (acrylonitrile-butadiene-styrene copolymer resin), and a PC (polycarbonate) reinforced with a filler, such as a glass fiber, are widely used as a substrate. Further, automotive parts, household appliances, and the like have a part comprised of a combination of a plurality of substrates, a part having a complicated and uneven shape, and the like. Therefore, the undercoat layer needs to have both excellent adhesion to the above various plastic substrates and excellent adhesion to an inorganic-material thin film.

As an undercoat agent for inorganic-material thin film, there has been known an ultraviolet curing resin composition of an organic solvent system, which contains an alkyd resin and a (meth)acrylate monomer, and which is diluted with an aromatic hydrocarbon solvent, such as toluene or xylene, a ketone solvent, an ester solvent, or the like (see PTL 1). However, recently, in the all fields of coating composition, there are increasing demands for an aqueous coating composition in an attempt to improve the working atmosphere or to reduce the burden on the environment, and the undercoat agent for inorganic-material thin film is also required by the market to be aqueous. As compared to an organic solvent resin, an aqueous resin has a considerable restriction on the resin design, and further is likely to produce a coating film having poor smoothness or poor adhesion to a substrate or the like, and the development of an aqueous undercoat agent for inorganic-material thin film, which overcomes the difficulties and satisfies the performances required by the market, is desired.

CITATION LIST

Patent Literature

PTL 1: JP-A-2015-13933

SUMMARY OF INVENTION

Technical Problem

Accordingly, a task to be achieved by the present invention is to provide an active-energy-ray-curable aqueous resin composition exhibiting excellent coating appearance and excellent adhesion to a substrate, an undercoat agent for inorganic-material thin film using the same, and a molded article using the undercoat agent for inorganic-material thin film.

Solution to Problem

The present inventors have conducted extensive and intensive studies with a view toward solving the above-mentioned problems. As a result, it has been found that an active-energy-ray-curable aqueous resin composition containing an alkyd resin which is aqueous due to acryl modification, and a (meth)acryloyl group-containing compound can provide excellent coating appearance and have excellent adhesion to a substrate, and the present invention has been completed.

Specifically, the present invention is directed to an active-energy-ray-curable aqueous resin composition including an acryl-modified alkyd resin (A) and a (meth)acryloyl group-containing compound (B) as essential components.

The invention is further directed to an undercoat agent for an inorganic-material thin film, including the active-energy-ray-curable aqueous resin composition.

The invention is further directed to a coating film including the undercoat agent for an inorganic-material thin film.

The invention is further directed to a molded article having an undercoat layer including the undercoat agent for an inorganic-material thin film.

Advantageous Effects of Invention

In the present invention, there can be provided an active-energy-ray-curable aqueous resin composition capable of providing excellent coating appearance and excellent adhesion to a substrate, an undercoat agent for inorganic-material thin film produced using the same, and a molded article produced using the undercoat agent for inorganic-material thin film.

DESCRIPTION OF EMBODIMENTS

The active-energy-ray-curable aqueous resin composition of the invention includes an acryl-modified alkyd resin (A) and a (meth)acryloyl group-containing compound (B) as essential components.

With respect to the method for producing the acryl-modified alkyd resin (A) and the specific structure of the acryl-modified alkyd resin (A), there is no particular limitation as long as the resin (A) is an alkyd resin having an acrylic polymer structural portion in the resin structure thereof, and various types of such acryl-modified alkyd resins can be used. As a specific example of the acryl-modified alkyd resin (A), there can be mentioned a reaction product of an acrylic resin intermediate (X) and an alkyd resin intermediate (Y) as reaction raw materials.

With respect to the specific structure of the acrylic resin intermediate (X), there is no particular limitation as long as the intermediate (X) has a functional group which is capable of reacting with the hydroxyl group or acid group of the alkyd resin intermediate (Y), and a wide variety of resins similar to a general acrylic resin can be used. Examples of the functional groups include an acid group, a hydroxyl group, an isocyanate group, and an amino group. Of these, from the viewpoint of obtaining an active-energy-ray-curable aqueous resin composition having excellent storage stability, the acrylic resin intermediate (X) preferably has an acid group. From the viewpoint of obtaining an active-energy-ray-curable aqueous resin composition having excellent storage stability, the acrylic resin intermediate (X) preferably has an acid value in the range of 50 to 300 mg KOH, more preferably in the range of 150 to 250 mg KOH.

Further, from the viewpoint of obtaining an active-energy-ray-curable aqueous resin composition having excellent storage stability and exhibiting excellent coating appearance and adhesion to a substrate, the acrylic resin intermediate (X) preferably has a weight average molecular weight (Mw) in the range of 1,000 to 50,000, more preferably in the range of 2,000 to 20,000. Furthermore, the acrylic resin intermediate (X) preferably has a molecular weight distribution (Mw/Mn) in the range of 2 to 10.

In the invention, the molecular weight and molecular weight distribution of a resin are a value measured by gel permeation chromatography (GPC) under the conditions shown below.

Measuring apparatus: HLC-8320GPC, manufactured by Tosoh Corp.
Columns: TSKgel 4000HXL, TSKgel 3000HXL, TSKgel 2000HXL, and
TSKgel 1000HXL, each of which is manufactured by Tosoh Corp.
Detector: RI (differential refractometer)
Data processing: Multistation GPC-8020 model II, manufactured by Tosoh Corp.
Conditions for measurement:
 Column temperature: 40° C.
 Solvent: Tetrahydrofuran
 Flow rate: 0.35 ml/minute
Standard: Monomodal polystyrene
Sample: A 0.2% tetrahydrofuran solution, in terms of the amount of the resin solids, which has been subjected to filtration using a microfilter (100 μl)

As an example of the acrylic resin intermediate (X), there can be mentioned an acrylic copolymer of an acid group-containing monomer and another monomer. Examples of the acid group-containing monomers include (meth)acrylic acid, (acryloyloxy)acetic acid, 2-carboxyethyl acrylate, and 3-carboxypropyl acrylate.

Examples of the other monomers include aliphatic (meth)acrylate monomers, such as methyl (meth)acrylate, ethyl (meth)acrylate, normalpropyl (meth)acrylate, isopropyl (meth)acrylate, normalbutyl (meth)acrylate, isobutyl (meth)acrylate, tertiarybutyl (meth)acrylate, pentyl (meth)acrylate, hexyl (meth)acrylate, heptyl (meth)acrylate, octyl (meth)acrylate, 2-ethylhexyl (meth)acrylate, and nonyl (meth)acrylate;

alicyclic (meth)acrylate monomers, such as cyclohexyl (meth)acrylate, isobornyl (meth)acrylate, dicyclopentanyl (meth)acrylate, and adamantyl mono(meth)acrylate;

heterocyclic (meth)acrylate monomers, such as glycidyl (meth)acrylate and tetrahydrofurfuryl acrylate;

aromatic (meth)acrylate monomers, such as phenyl (meth)acrylate, benzyl (meth)acrylate, phenoxy (meth)acrylate, and phenoxyethyl acrylate;

hydroxyl group-containing (meth)acrylate monomers, such as hydroxyethyl (meth)acrylate, hydroxypropyl (meth)acrylate, and hydroxybutyl acrylate;

silyl group-containing (meth)acrylate monomers, such as 3-methacryloxypropyltrimethoxysilane;

aminoalkyl (meth)acrylate monomers, such as N,N-dimethylaminoethyl (meth)acrylate, N,N-diethylaminoethyl (meth)acrylate, and N,N-diethylaminopropyl (meth)acrylate;

(per)fluoroalkyl (meth)acrylate monomers, such as 2,2,2-trifluoroethyl (meth)acrylate, 2,2,3,3-tetrafluoropropyl (meth)acrylate, 1H,1H,5H-octafluoropentyl (meth)acrylate, 1H,1H,2H,2H-heptadecafluorodecyl (meth)acrylate, and perfluoroethyloxyethyl (meth)acrylate;

(per)fluoroalkyl perfluorovinyl ethers having a (per)fluoroalkyl group having 1 to 18 carbon atoms, such as trifluoromethyl trifluorovinyl ether, pentafluoroethyl trifluorovinyl ether, and heptafluoropropyl trifluorovinyl ether;

unsaturated dicarboxylates, such as dimethyl fumarate, diethyl fumarate, dibutyl fumarate, dimethyl itaconate, dibutyl itaconate, methylethyl fumarate, methylbutylfumarate, and methylethyl itaconate;

aromatic vinyl monomers, such as styrene, α-methylstyrene, and chlorostyrene;

diene compounds, such as butadiene, isoprene, piperylene, and dimethylbutadiene;

vinyl halides or vinylidene halides, such as vinyl chloride and vinyl bromide;

unsaturated ketones, such as methyl vinyl ketone and butyl vinyl ketone;

vinyl esters, such as vinyl acetate and vinyl butyrate;

vinyl ethers, such as methyl vinyl ether and butyl vinyl ether;

vinyl cyanides, such as acrylonitrile, methacrylonitrile, and vinylidene cyanide;

acrylamides or alkyd-substituted amides thereof;

N-substituted maleimides, such as N-phenylmaleimide and N-cyclohexylmaleimide; and fluorine-containing α-olefins, such as vinyl fluoride, vinylidene fluoride, trifluoroethylene, chlorotrifluoroethylene, bromotrifluoroethylene, pentafluoropropylene, and hexafluoropropylene. These may be used individually or in combination.

From the viewpoint of obtaining an active-energy-ray-curable aqueous resin composition exhibiting further excellent coating appearance and adhesion to a substrate, the acrylic resin intermediate (X) is preferably produced using an oil or a fatty acid as one of the reaction raw materials. In this case, the acrylic resin intermediate (X) preferably has an oil length of 10 or more, more preferably in the range of 10 to 50. The oil length of a resin means the ratio of the mass of an oil or fatty acid to the total mass of the raw materials for the resin, in terms of a percentage.

Examples of the oils or fatty acids include oils, such as linseed oil, tung oil, rice oil, sunflower oil, soybean oil, tall oil, rapeseed oil, palm oil, castor oil, dehydrated castor oil, and coconut oil; fatty acids derived from the above oils; oils reclaimed from the above oils; and higher fatty acids having 12 to 30 carbon atoms, such as oleic acid, linoleic acid, linolenic acid, arachidonic acid, and docosahexaenoic acid. These may be used individually or in combination. Of these, from the viewpoint of obtaining an active-energy-ray-curable aqueous resin composition exhibiting further excellent coating appearance and adhesion to a substrate, an oil or fatty acid having an iodine value of 100 or more is preferred. Specific examples of oils or fatty acids having an iodine value of 100 or more include tung oil, linseed oil, dehydrated castor oil, soybean oil, sunflower oil, and tall oil; fatty acids derived from the above oils; and oils reclaimed from the above oils.

The acrylic resin intermediate (X) can be produced by a method similar to that for a general acrylic resin. As a specific example of the method for producing the acrylic resin intermediate (X), there can be mentioned, for example, a method in which a mixture of an acrylic monomer and a polymerization initiator is added dropwise to a flask into which an organic solvent has been added in advance, and the resultant mixture is subjected to polymerization under conditions at a temperature of about 80 to 150° C. The mixture of an acrylic monomer and a polymerization initiator may be diluted with an organic solvent if necessary. Further, when the acrylic resin intermediate (X) is produced using an oil or a fatty acid as one of the reaction raw materials, there can be mentioned a method in which a mixture of an acrylic monomer and a polymerization initiator is added dropwise to a flask into which an organic solvent and an oil or a fatty acid have been charged, and the resultant mixture is subjected to polymerization under conditions at a temperature of about 80 to 150° C. Also in this case, the mixture of an acrylic monomer and a polymerization initiator may be diluted with an organic solvent if necessary.

As the alkyd resin intermediate (Y), specifically, there can be mentioned a polyester resin produced using a polybasic acid (y1), a polyhydric alcohol (y2), and an oil or fatty acid (y3) as essential reaction raw materials. From the viewpoint of obtaining an active-energy-ray-curable aqueous resin composition exhibiting excellent coating appearance and adhesion to a substrate, the alkyd resin intermediate (Y) preferably has an oil length of 10 or more, more preferably in the range of 25 to 70.

From the viewpoint of obtaining an active-energy-ray-curable aqueous resin composition having excellent storage stability and exhibiting excellent coating appearance and adhesion to a substrate, the alkyd resin intermediate (Y) preferably has a weight average molecular weight (Mw) in the range of 1,000 to 100,000, more preferably in the range of 2,000 to 50,000. The alkyd resin intermediate (Y) preferably has a molecular weight distribution (Mw/Mn) in the range of 2 to 50. Further, the alkyd resin intermediate (Y) preferably has an acid value in the range of 10 to 100 mg KOH/g, and preferably has a hydroxyl value in the range of 10 to 150 mg KOH/g.

Examples of the polybasic acids (y1) include aliphatic dibasic acids, such as malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, and icosanedioic acid; aliphatic unsaturated dibasic acids or anhydrides thereof, such as tetrahydrophthalic acid, maleic acid, maleic anhydride, fumaric acid, citraconic acid, itaconic acid, and glutaconic acid; alicyclic dibasic acids, such as hexahydrophthalic acid and 1,4-cyclohexanedicarboxylic acid; aromatic dibasic acids or anhydrides thereof, such as phthalic acid, phthalic anhydride, terephthalic acid, isophthalic acid, and orthophthalic acid; aliphatic tribasic acids, such as 1,2,5-hexanetricarboxylic acid and 1,2,4-cyclohexanetricarboxylic acid; and aromatic tribasic acids or anhydrides thereof, such as trimellitic acid, trimellitic anhydride, 1,2,5-benzenetricarboxylic acid, and 2,5,7-naphthalenetricarboxylic acid. These may be used individually or in combination. Of these, an aromatic polybasic acid is preferably used as an essential component from the viewpoint of obtaining an active-energy-ray-curable aqueous resin composition exhibiting excellent coating appearance and adhesion to a substrate and having excellent heat resistance.

Examples of the polyhydric alcohols (y2) include diols, such as ethylene glycol, diethylene glycol, propylene glycol, dipropylene glycol, 1,3-propanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl-1,5-pentanediol, neopentyl glycol, 1,6-hexanediol, 1,4-bis(hydroxymethyl)cyclohexane, and 2,2,4-trimethyl-1,3-pentanediol; polyols, such as trimethylolethane, trimethylolpropane, glycerol, hexanetriol, and pentaerythritol; modified polyether polyols obtained by ring-opening polymerization of the above diol or polyol and a cyclic ether linkage-containing compound, such as ethylene oxide, propylene oxide, tetrahydrofuran, ethyl glycidyl ether, propyl glycidyl ether, butyl glycidyl ether, phenyl glycidyl ether, or allyl glycidyl ether; and lactone polyester polyols obtained by a polycondensation reaction of the above diol or polyol and a lactone, such as ε-caprolactone. These may be used individually or in combination. Of these, in view of obtaining an active-energy-ray-curable aqueous resin composition exhibiting excellent coating appearance and adhesion to a substrate and having excellent alkali resistance, acid resistance, and solvent resistance and the like, a tri-functional or multifunctional polyhydric alcohol, e.g., a polyol, such as trimethylolethane, trimethylolpropane, glycerol, hexanetriol, or pentaerythritol, or a modified polyol thereof is preferably used. Further, in view of obtaining an active-energy-ray-curable aqueous resin composition having excellent storage stability, a polyhydric alcohol having a (poly) oxyethylene structure in the molecular structure is preferably used. When a polyhydric alcohol having a (poly) oxyethylene structure is used, the proportion of the polyhydric alcohol having a (poly) oxyethylene structure is preferably in the range of 0.1 to 50% by mass, more preferably in the range of 1 to 30% by mass, based on the total mass of the reaction raw materials for the acryl-modified alkyd resin (A).

Examples of the oils or fatty acids (y3) include oils, such as linseed oil, tung oil, rice oil, sunflower oil, soybean oil, tall oil, rapeseed oil, palm oil, castor oil, dehydrated castor oil, and coconut oil; fatty acids derived from the above oils; oils reclaimed from the above oils; and higher fatty acids having 12 to 30 carbon atoms, such as oleic acid, linoleic acid, linolenic acid, arachidonic acid, and docosahexaenoic acid. These may be used individually or in combination. Of these, from the viewpoint of obtaining an active-energy-ray-curable aqueous resin composition exhibiting further excellent coating appearance and adhesion to a substrate, an oil or fatty acid having an iodine value of 100 or more is preferred. Specific examples of oils or fatty acids having an iodine value of 100 or more include tung oil, linseed oil, dehydrated castor oil, soybean oil, sunflower oil, and tall oil; fatty acids derived from the above oils; and oils reclaimed from the above oils.

The alkyd resin intermediate (Y) may be produced using a monobasic acid (y4) as one of the reaction raw materials if necessary. Examples of monobasic acids (y4) include methanoic acid, ethanoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, benzoic acid, para-tertiarybutylbenzoic acid, and rosin. These may be used individually or in combination. Of these, from the viewpoint of obtaining an active-energy-ray-curable aqueous resin composition exhibiting excellent coating appearance and adhesion to a substrate and having excellent heat resistance, a monobasic acid having a cyclic structure, such as benzoic acid, para-tertiarybutylbenzoic acid, or rosin, is preferably used.

The alkyd resin intermediate (Y) can be produced by a method similar to that for a general alkyd resin. As a specific example of the method for producing the alkyd resin intermediate (Y), there can be mentioned, for example, a method in which all the reaction raw materials are charged into a reaction vessel at a time and subjected to reaction at a temperature of about 120 to 300° C.

When the acryl-modified alkyd resin (A) is a reaction product of the acrylic resin intermediate (X) and the alkyd resin intermediate (Y) as reaction raw materials, as an example of the method for producing the acryl-modified alkyd resin (A), there can be mentioned a method in which the acrylic resin intermediate (X) and the alkyd resin intermediate (Y) are added at a time or added portion by portion to a reaction vessel and subjected to reaction at a temperature of about 120 to 300° C. The acrylic resin intermediate (X) and the alkyd resin intermediate (Y), which have been individually preliminarily produced, may be used, or one of the acrylic resin intermediate (X) and the alkyd resin intermediate (Y) which have been individually preliminarily produced may be added at a time or added portion by portion to a reaction vessel containing another one.

The acryl-modified alkyd resin (A) may be a urethane modification product produced using a polyisocyanate compound as one of the reaction raw materials, or a phenolic resin modification product produced using a phenolic resin as one of the reaction raw materials.

In any method, from the viewpoint of obtaining an active-energy-ray-curable aqueous resin composition exhibiting excellent coating appearance and adhesion to a substrate, the mass ratio of the acrylic resin intermediate (X) to the alkyd resin intermediate (Y) [ (X)/(Y)] is preferably in the range of 1/1 to 1/5. Further, the mass ratio of the total of the acrylic resin intermediate (X) and the alkyd resin intermediate (Y) to the total mass of the reaction raw materials for the acryl-modified alkyd resin (A) is preferably 50% by mass or more, more preferably 80% by mass or more.

With respect to the urethane modification product of the acryl-modified alkyd resin (A), examples of the polyisocyanate compounds used include aliphatic diisocyanate compounds, such as butane diisocyanate, hexamethylene diisocyanate, 2,2,4-trimethylhexamethylene diisocyanate, and 2,4,4-trimethylhexamethylene diisocyanate; alicyclic diisocyanate compounds, such as norbornane diisocyanate, isophorone diisocyanate, hydrogenated xylylene diisocyanate, and hydrogenated diphenylmethane diisocyanate; aromatic diisocyanate compounds, such as tolylene diisocyanate, xylylene diisocyanate, tetramethylxylylene diisocyanate, diphenylmethane diisocyanate, and 1,5-naphthalene diisocyanate; polymethylene polyphenyl polyisocyanates having a repeating structure represented by the structural formula (1) below; and isocyanurate modification products, biuret modification products, and allophanate modification products thereof. These may be used individually or in combination. Of these, from the viewpoint of obtaining an active-energy-ray-curable aqueous resin composition exhibiting excellent coating appearance and adhesion to a substrate and having excellent heat resistance, a polyisocyanate compound having a cyclic structure in the molecular structure thereof is preferred, and an alicyclic diisocyanate is especially preferred.

[Chem. 3]

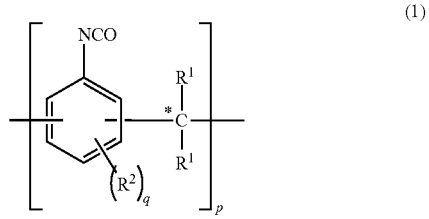

Wherein each $R^1$ is independently a hydrogen atom or a hydrocarbon group having 1 to 6 carbon atoms; each $R^2$ is independently an alkyl group having 1 to 4 carbon atoms or a bonding site that links to the structural site represented by the structural formula (1) through a methylene group indicated by symbol *; q is 0 or an integer of 1 to 3; and p is an integer of 1 or more.

The urethane modification product of the acryl-modified alkyd resin (A) can be produced by, for example, a method in which a polyisocyanate compound is used as one of the reaction raw materials for the acrylic resin intermediate (X) or the alkyd resin intermediate (Y), a method in which the acrylic resin intermediate (X), the alkyd resin intermediate (Y), and the polyisocyanate compound are reacted at a time, or a method in which the acryl-modified alkyd resin (A), which has been preliminarily obtained by reacting the acrylic resin intermediate (X) and the alkyd resin intermediate (Y), is reacted with a polyisocyanate compound. Of these, from the viewpoint of easily controlling the reaction, preferred is a method in which the acryl-modified alkyd resin (A) is further reacted with a polyisocyanate compound. The reaction of the acryl-modified alkyd resin (A) with a polyisocyanate compound can be conducted under conditions similar to those for a general urethane-forming reaction.

With respect to the phenolic resin modification product of the acryl-modified alkyd resin (A), examples of the phenolic resins used include a resol phenolic resin and a novolak phenolic resin. The phenolic resin modification product of the acryl-modified alkyd resin (A) can be produced by, for example, a method in which a phenolic resin is used as one of the reaction raw materials for the acrylic resin intermediate (X) or the alkyd resin intermediate (Y), a method in which the acrylic resin intermediate (X) and the alkyd resin intermediate (Y) as well as a phenolic resin are used, and a method in which the acryl-modified alkyd resin (A) is further reacted with a phenolic resin.

From the viewpoint of obtaining an active-energy-ray-curable aqueous resin composition having excellent storage stability and exhibiting excellent coating appearance and adhesion to a substrate, the acryl-modified alkyd resin (A) preferably has an oil length in the range of 10 to 70, more preferably in the range of 30 to 60. Further, the acryl-modified alkyd resin (A) preferably has a weight average molecular weight (Mw) in the range of 5,000 to 500,000, more preferably in the range of 10,000 to 200,000. The acryl-modified alkyd resin (A) preferably has a molecular weight distribution (Mw/Mn) in the range of 2 to 200, more preferably in the range of 5 to 100. Further, the acryl-modified alkyd resin (A) preferably has an acid value in the range of 10 to 100 mg KOH/g, more preferably in the range of 20 to 80 mg KOH/g.

Examples of the (meth)acryloyl group-containing compounds (B) include a mono(meth)acrylate compound and a modification product thereof (B1), an aliphatic hydrocarbon poly(meth)acrylate compound and a modification product thereof (B2), an alicyclic poly(meth)acrylate compound and a modification product thereof (B3), an aromatic poly(meth)acrylate compound and a modification product thereof (B4), an epoxy (meth)acrylate resin and a modification product thereof (B5), a urethane (meth)acrylate resin and a modification product thereof (B6), an acryl (meth)acrylate resin and a modification product thereof (B7), and a dendrimer (meth)acrylate resin and a modification product thereof (B8).

Examples of the mono(meth)acrylate compounds and modification products thereof (B1) include aliphatic mono(meth)acrylate compounds, such as methyl(meth)acrylate, ethyl (meth)acrylate, hydroxyethyl (meth)acrylate, propyl (meth)acrylate, hydroxypropyl (meth)acrylate, butyl (meth)acrylate, and 2-ethylhexyl (meth)acrylate; alicyclic mono(meth)acrylate compounds, such as cyclohexyl (meth)acrylate, isobornyl (meth)acrylate, and adamantyl mono(meth)acrylate; heterocyclic mono(meth)acrylate compounds, such as glycidyl (meth)acrylate and tetrahydrofurfuryl acrylate; aromatic mono(meth)acrylate compounds, such as phenyl (meth)acrylate, benzyl (meth)acrylate, phenoxy (meth)acrylate, phenoxyethyl (meth)acrylate, phenoxyethoxyethyl (meth)acrylate, 2-hydroxy-3-phenoxypropyl (meth)acrylate, phenylphenol (meth)acrylate, phenylbenzyl (meth)acrylate, phenoxybenzyl (meth)acrylate, benzylbenzyl (meth)acrylate, phenylphenoxyethyl (meth)acrylate, and paracumylphenol (meth)acrylate; (poly)oxyalkylene modification products obtained by introducing a (poly)oxyalkylene chain, such as a (poly)oxyethylene chain, a (poly)oxypropylene chain, or a (poly)oxytetramethylene chain, into the molecular structure of the above mono(meth)acrylate compound; and lactone modification products obtained by introducing a (poly)lactone structure into the molecular structure of the above mono(meth)acrylate compound.

Examples of the aliphatic hydrocarbon poly(meth)acrylate compounds and modification products thereof (B2) include aliphatic di(meth)acrylate compounds, such as ethylene glycol di(meth)acrylate, propylene glycol di(meth)acrylate, butanediol di(meth)acrylate, hexanediol di(meth)acrylate, and neopentyl glycol di(meth)acrylate; aliphatic tri(meth)acrylate compounds, such as trimethylolpropane tri(meth)acrylate, glycerol tri(meth)acrylate, pentaerythritol tri(meth)acrylate, ditrimethylolpropane tri(meth)acrylate, and dipentaerythritol tri(meth)acrylate; tetra-functional or multifunctional aliphatic poly(meth)acrylate compounds, such as pentaerythritol tetra (meth)acrylate, ditrimethylolpropane tetra(meth)acrylate, dipentaerythritol tetra(meth)acrylate, dipentaerythritol penta (meth)acrylate, and dipentaerythritol hexa(meth)acrylate; (poly)oxyalkylene modification products obtained by introducing a (poly)oxyalkylene chain, such as a (poly)oxyethylene chain, a (poly)oxypropylene chain, or a (poly)oxytetramethylene chain, into the molecular structure of the above aliphatic hydrocarbon poly(meth)acrylate compound; and lactone modification products obtained by introducing a (poly) lactone structure into the molecular structure of the above aliphatic hydrocarbon poly(meth)acrylate compound.

Examples of the alicyclic poly(meth)acrylate compounds and modification products thereof (B3) include alicyclic di(meth)acrylate compounds, such as 1,4-cyclohexanedimethanol di(meth)acrylate, norbornane di(meth)acrylate, norbornanedimethanol di(meth)acrylate, dicyclopentanyl di(meth)acrylate, and tricyclodecanedimethanol di(meth)acrylate; (poly)oxyalkylene modification products obtained by introducing a (poly)oxyalkylene chain, such as a (poly)oxyethylene chain, a (poly)oxypropylene chain, or a (poly)oxytetramethylene chain, into the molecular structure of the above alicyclic poly(meth)acrylate compound; and lactone modification products obtained by introducing a (poly) lactone structure into the molecular structure of the above alicyclic poly(meth)acrylate compound.

Examples of the aromatic poly(meth)acrylate compounds and modification products thereof (B4) include biphenol di (meth)acrylate and bisphenol di (meth)acrylate; (poly)oxyalkylene modification products obtained by introducing a (poly)oxyalkylene chain, such as a (poly)oxyethylene chain, a (poly)oxypropylene chain, or a (poly)oxytetramethylene chain, into the molecular structure of the above aromatic poly(meth)acrylate compound; and lactone modification products obtained by introducing a (poly) lactone structure into the molecular structure of the above aromatic poly (meth)acrylate compound.

As examples of the epoxy (meth)acrylate resins and modification products thereof (B5), there can be mentioned ones which are obtained by, for example, reacting an epoxy resin with (meth)acrylic acid or an anhydride thereof. Examples of the epoxy resins include diglycidyl ethers of a dihydric phenol, such as hydroquinone or catechol; diglycidyl ethers of a biphenol compound, such as 3,3'-biphenyldiol or 4,4'-biphenyldiol; bisphenol epoxy resins, such as a bisphenol A epoxy resin, a bisphenol B epoxy resin, a bisphenol F epoxy resin, and a bisphenol S epoxy resin; polyglycidyl ethers of a naphthol compound, such as 1,4-naphthalenediol, 1,5-naphthalenediol, 1,6-naphthalenediol, 2,6-naphthalenediol, 2,7-naphthalenediol, binaphthol, or bis (2,7-dihydroxynaphthyl) methane; triglycidyl ethers, such as 4,4',4"-methylidynetrisphenol; novolak epoxy resins, such as a phenolic novolak epoxy resin and a cresol novolak resin; (poly)oxyalkylene modification products obtained by introducing a (poly)oxyalkylene chain, such as a (poly)oxyethylene chain, a (poly)oxypropylene chain, or a (poly)oxytetramethylene chain, into the molecular structure of the above epoxy resin; and lactone modification products obtained by introducing a (poly)lactone structure into the molecular structure of the above epoxy resin.

As examples of the urethane (meth)acrylate resins and modification products thereof (B6), there can be mentioned ones which are obtained by, for example, reacting a polyisocyanate compound and a hydroxyl group-containing (meth)acrylate compound and, if necessary, a polyol compound. Examples of the polyisocyanate compounds include aliphatic diisocyanate compounds, such as butane diisocyanate, hexamethylene diisocyanate, 2,2,4-trimethylhexamethylene diisocyanate, and 2,4,4-trimethylhexamethylenediisocyanate; alicyclic diisocyanate compounds, such as norbornane diisocyanate, isophorone diisocyanate, hydrogenated xylylene diisocyanate, and hydrogenated diphenylmethane diisocyanate; aromatic diisocyanate compounds, such as tolylene diisocyanate, xylylene diisocyanate, tetramethylxylylene diisocyanate, diphenylmethane diisocyanate, and 1,5-naphthalene diisocyanate; polymethylene polyphenyl polyisocyanates having a repeating structure represented by the structural formula (1) above; and isocyanurate modification products, biuret modification products, and allophanate modification products thereof.

Examples of the hydroxyl group-containing (meth)acrylate compounds include hydroxyl group-containing (meth)acrylate compounds, such as hydroxyethyl (meth)acrylate, hydroxypropyl (meth)acrylate, trimethylolpropane di(meth)acrylate, pentaerythritol tri(meth)acrylate, ditrimethylolpropane tri(meth)acrylate, and dipentaerythritol penta(meth)acrylate; (poly)oxyalkylene modification products obtained by introducing a (poly)oxyalkylene chain, such as a (poly)oxyethylene chain, a (poly)oxypropylene chain, or a (poly)

oxytetramethylene chain, into the molecular structure of the above hydroxyl group-containing (meth)acrylate compound; and lactone modification products obtained by introducing a (poly)lactone structure into the molecular structure of the above hydroxyl group-containing (meth)acrylate compound.

Examples of the polyol compounds include aliphatic polyol compounds, such as ethylene glycol, propylene glycol, butanediol, hexanediol, glycerol, trimethylolpropane, ditrimethylolpropane, pentaerythritol, and dipentaerythritol; aromatic polyol compounds, such as biphenol and bisphenol; (poly)oxyalkylene modification products obtained by introducing a (poly)oxyalkylene chain, such as a (poly)oxyethylene chain, a (poly)oxypropylene chain, or a (poly)oxytetramethylene chain, into the molecular structure of the above polyol compound; lactone modification products obtained by introducing a (poly)lactone structure into the molecular structure of the above polyol compound; and hydroxyl group-containing acrylic resins.

Examples of the hydroxyl group-containing acrylic resins include acrylic copolymers of a hydroxyl group-containing monomer and another monomer. Examples of the hydroxyl group-containing monomers include (meth)acrylate monomers (a), such as hydroxyethyl (meth)acrylate and hydroxypropyl (meth)acrylate.

Examples of the other monomers include alkyl (meth)acrylates, such as methyl (meth)acrylate, ethyl (meth)acrylate, propyl (meth)acrylate, butyl (meth)acrylate, and 2-ethylhexyl (meth)acrylate; cyclo-ring-containing (meth)acrylates, such as cyclohexyl (meth)acrylate, isobornyl (meth)acrylate, and dicyclopentanyl (meth)acrylate; aromatic ring-containing (meth)acrylates, such as phenyl (meth)acrylate, benzyl (meth)acrylate, and phenoxyethyl acrylate; carboxyl group-containing monomers, such as (meth)acrylic acid; isocyanate group-containing monomers, such as 2-acryloyloxyethyl isocyanate, 2-methacryloyloxyethyl isocyanate, and 1,1-bis(acryloyloxymethyl)ethyl isocyanate; glycidyl group-containing monomers, such as glycidyl (meth)acrylate and 4-hydroxybutyl acrylate glycidyl ether; silyl group-containing (meth)acrylates, such as 3-methacryloxypropyltrimethoxysilane; styrene derivatives, such as styrene, a-methylstyrene, and chlorostyrene; and (meth)acrylates having a (poly)oxyalkylene glycol chain. These may be used individually or in combination.

The hydroxyl group-containing acrylic resin preferably has a weight average molecular weight (Mw) in the range of 1,000 to 20,000. The hydroxyl group-containing acrylic resin preferably has a hydroxyl value of 100 mg KOH/g or less, more preferably 60 mg KOH/g or less. Further, the hydroxyl group-containing acrylic resin preferably has an acid value of 50 mg KOH/g or less.

In the active-energy-ray-curable aqueous resin composition of the invention, the ratio of the acryl-modified alkyd resin (A) to the (meth)acryloyl group-containing compound (B) blended may be freely adjusted according to desired various performances, but, from the viewpoint of obtaining an active-energy-ray-curable aqueous resin composition exhibiting further excellent adhesion of the cured coating film to a substrate and heat resistance, the mass ratio of the acryl-modified alkyd resin (A) to the (meth)acryloyl group-containing compound (B) [(A)/(B)] is preferably in the range of 20/80 to 80/20.

Further, the total of the acryl-modified alkyd resin (A) and the (meth)acryloyl group-containing compound (B) contained is preferably 65 parts by mass or more, more preferably 70 parts by mass or more, especially preferably 80 parts by mass or more, relative to 100 parts by mass of the total of the resin solids contained in the active-energy-ray-curable aqueous resin composition.

In the active-energy-ray-curable aqueous resin composition of the invention, with respect to the method for making aqueous the acryl-modified alkyd resin (A) and the (meth)acryloyl group-containing compound (B), there is no particular limitation, and a variety of methods can be used. Specifically, there can be mentioned a method in which respective solutions or dispersions of the acryl-modified alkyd resin (A) and the (meth)acryloyl group-containing compound (B) in an aqueous solvent are produced and mixed with each other, and a method in which both the acryl-modified alkyd resin (A) and the (meth)acryloyl group-containing compound (B) are dissolved or dispersed in an aqueous solvent at a time.

As a method for producing a solution or dispersion of the acryl-modified alkyd resin (A) or the (meth)acryloyl group-containing compound (B) in an aqueous solvent, for example, when the acryl-modified alkyd resin (A) or the (meth) acryloyl group-containing compound (B) has an acid group, there can be mentioned a method in which the acryl-modified alkyd resin (A) or the (meth)acryloyl group-containing compound (B) is neutralized with an amine compound or the like and dissolved or dispersed in an aqueous solvent. Alternatively, a solution or dispersion may be produced using an emulsifying agent or the like.

Examples of the amine compounds used in the neutralization step include monomethylamine, dimethylamine, trimethylamine, monoethylamine, diethylamine, triethylamine, mono-n-propylamine, dimethyl-n-propylamine, monoethanolamine, diethanolamine, triethanolamine, N-methylethanolamine, N-aminoethylethanolamine, N-methyldiethanolamine, monoisopropanolamine, diisopropanolamine, triisopropanolamine, N,N-dimethylethanolamine, N,N-dimethylpropanolamine, dimethylaminopropylacrylamide, diethylacrylamide, isopropylacrylamide, dimethylaminoethyl acrylate, and diethylaminoethyl methacrylate. These may be used individually or in combination. The amount of the amine compound added is preferably in the range of 40 to 120 mol %, based on the mole of the acid group in the acryl-modified alkyd resin (A) or the (meth)acryloyl group-containing compound (B).

With respect to the method for neutralizing the acryl-modified alkyd resin (A) and the (meth)acryloyl group-containing compound (B) with an amine compound to produce an active-energy-ray-curable aqueous resin composition, there is no particular limitation, and the composition may be produced by any method. As an example of the method, there can be mentioned the following method. An amine compound is first added to a solution of the acryl-modified alkyd resin (A), the (meth)acryloyl group-containing compound (B), or a mixture thereof in a solvent, and the resultant mixture is stirred under temperature conditions at room temperature to about 80° C. to neutralize the resin(s). Then, an aqueous solvent is added dropwise or added portion by portion to the resultant mixture, and the solvent originally contained is distilled off under reduced pressure and heating conditions to obtain an active-energy-ray-curable aqueous resin composition.

Examples of the aqueous solvents include water and various types of hydrophilic solvents. Examples of the hydrophilic solvents include alkylene glycol monoalkyl ethers, such as ethylene glycol monomethyl ether, ethylene glycol monoethyl ether, ethylene glycol monopropyl ether, ethylene glycol monobutyl ether, and propylene glycol monomethyl ether; dialkylene glycol dialkyl ethers, such as diethylene glycol dimethyl ether, diethylene glycol diethyl ether, diethylene glycol dipropyl ether, and diethylene glycol dibutyl ether; and alkylene glycol alkyl ether acetates, such as ethylene glycol monomethyl ether acetate, ethylene glycol monoethyl ether acetate, and propylene glycol monomethyl ether acetate. These may be used individually or in combination. Of these, preferred is an aqueous solvent of which 80% by mass or more is water.

The active-energy-ray-curable aqueous resin composition of the invention preferably contains a photopolymerization initiator for causing a curing reaction using an active energy ray to advantageously proceed. Specific examples of photopolymerization initiators include alkylphenone photopolymerization initiators, such as 1-hydroxy-cyclohexyl-phenyl-ketone, 2-benzyl-2-dimethylamino-1-(4-morpholinophenyl)-butanone-1, and 2-(dimethylamino)-2-[(4-methylphenyl)methyl]-1-[4-(4-morpholinyl)phenyl]-1-butanone; acylphosphine oxide photopolymerization initiators, such as 2,4,6-trimethylbenzoyl-diphenyl-phosphine oxide; and intramolecular hydrogen abstraction-type photopolymerization initiators, such as benzophenone compounds. These may be used individually or in combination. Examples of commercially available products of the photopolymerization initiators include "IRGACURE 127", "IRGACURE 184", "IRGACURE 250", "IRGACURE 270", "IRGACURE 290", "IRGACURE 369E", "IRGACURE 379EG", "IRGACURE 500", "IRGACURE 651", "IRGACURE 754", "IRGACURE 819", "IRGACURE 907", "IRGACURE 1173", "IRGACURE 2959", "IRGACURE MBF", "IRGACURE TPO", "IRGACURE OXE 01", and "IRGACURE OXE 02", each of which is manufactured by BASF AG.

The amount of the photopolymerization initiator added is preferably in the range of 0.05 to 20 parts by mass, more preferably in the range of 0.1 to 10 parts by mass, relative to 100 parts by mass of the components remaining after removing the aqueous solvent from the active-energy-ray-curable aqueous resin composition.

The active-energy-ray-curable aqueous resin composition of the invention may contain various additives according to desired performance. Examples of various additives include a polycarbodiimide resin, an oxazoline group-containing resin, an amino resin, a fluorine additive, a silicone additive, a cellulose additive, an ultraviolet light absorber, an antioxidant, a photosensitizer, a silane coupling agent, a rheology controlling agent, a defoamer, an antistatic agent, an anti-fogging agent, an adhesion promoter, an organic pigment, an inorganic pigment, a loading pigment, an organic filler, and an inorganic filler. The amount of the additive added is appropriately controlled according to desired performance.

The active-energy-ray-curable aqueous resin composition of the invention has features such that it not only exhibits excellent coating film appearance and high adhesion to various substrates but also has excellent heat resistance and excellent storage stability. With respect to the industrial application of the active-energy-ray-curable aqueous resin composition of the invention, there is no particular limitation, and the composition of the invention can be used in various coating composition applications and the like. Among various coating composition applications, particularly, the composition of the invention can be preferably used as an undercoat agent for inorganic-material thin film. Hereinbelow, details of the case of using the active-energy-ray-curable aqueous resin composition of the invention as an undercoat layer for inorganic-material thin film are described.

The active-energy-ray-curable aqueous resin composition of the invention has high adhesion to various materials, and hence, with respect to the substrate, there is no particular limitation, and various types of materials can be used. Specific examples of materials for the substrate include various resin materials, such as a polyethylene terephthalate (PET) resin, a polybutylene terephthalate (PBT) resin, a PET/PBT alloy resin, an unsaturated polyester resin, a polyethylene resin, a polypropylene resin, a polyphenylene sulfide (PPS) resin, a polycarbonate resin, an acrylonitrile-butadiene-styrene copolymer resin (ABS), an acrylic (PMMA) resin, and a polyamide resin, resin materials reinforced with a glass fiber, a filler, or the like, such as a bulk molding compound (BMC), and an aluminum die cast (ALD).

In forming the undercoat layer, the active-energy-ray-curable aqueous resin composition of the invention is applied onto a substrate by a method, such as spray coating, dip coating, spin coating, flow coating, or roller coating. With respect to the amount of the composition applied, the thickness of the cured film is preferably in the range of 5 to 60 μm, more preferably in the range of 10 to 40 μm. The thickness of the cured coating film is preferably in the above range for causing the coating film to exhibit an adhesive effect and to exhibit curing properties.

After the active-energy-ray-curable aqueous resin composition is applied onto the substrate by the above-mentioned method, for the purpose of volatilizing the aqueous solvent in the resin composition, the applied composition is preheated under conditions at a temperature in the range of 50 to 150° C. for 5 to 25 minutes.

After completion of the above-mentioned preheating step, the resin composition is cured by irradiation with an active energy ray, so that the undercoat layer is formed. Examples of the active energy rays used in the invention include an ultraviolet light and an electron beam. When the resin composition is cured using an ultraviolet light, an ultraviolet light emission apparatus having a xenon lamp, a high-pressure mercury lamp, or a metal halide lamp as a light source can be used, and, if necessary, the amount of light, the arrangement of the light source, and the like are controlled. In the invention, the composition applied is preferably irradiated with an ultraviolet light so that the integrated amount of light becomes 50 to 5,000 mJ/cm$^2$, more preferably irradiated with an ultraviolet light so that the integrated amount of light becomes 300 to 4,000 mJ/cm$^2$.

On the substrate having the undercoat layer in the invention formed thereon as mentioned above, a thin film of an inorganic material formed by a method, such as vacuum deposition or sputtering, is disposed, and, if desired, a topcoat layer or the like is further disposed on the thin film. Examples of the inorganic materials include silicon, aluminum, iron, nickel, chromium, copper, silver, zinc, tin, indium, magnesium, zirconium, titanium, oxides thereof, and alloys thereof. The inorganic-material thin film preferably has a thickness in the range of 30 nm to 3 μm. Examples of the topcoat layers include a clear coating film formed using an acrylic lacquer coating composition, an acrylmelamine curing coating composition, an aluminum chelate acrylic coating composition, an active-energy-ray-curable coating composition or the like, and an SiOx layer formed by a plasma polymerization method. When the topcoat layer is a clear coating film, the topcoat layer preferably has a thickness in the range of 3 to 40 μm. Further, when the topcoat layer is an SiOx layer, the topcoat layer preferably has a thickness in the range of 30 to 300 nm.

Examples of the molded articles obtained as mentioned above include a light reflector for automotive exterior lamp, various types of packaging materials, and electric and electronic members. By using the active-energy-ray-curable aqueous resin composition of the invention as an undercoat layer for an inorganic-material thin film, a molded article having coating appearance effectively utilizing the metallic luster of the inorganic-material thin film can be obtained.

EXAMPLES

Hereinbelow, the present invention will be described in more detail with reference to the following specific synthesis examples and Examples. In the following Examples, "part(s)" and "%" are given by mass unless otherwise specified.

In the Examples of the present invention, the number average molecular weight (Mn), weight average molecular weight (Mw), and molecular weight distribution (Mw/Mn) were measured by gel permeation chromatography (GPC) under the conditions shown below.
Measuring apparatus: HLC-8320GPC, manufactured by Tosoh Corp.
Columns: TSKgel 4000HXL, TSKgel 3000HXL, TSKgel 2000HXL, and TSKgel 1000HXL, each of which is manufactured by Tosoh Corp.
Detector: RI (differential refractometer)
Data processing: Multistation GPC-8020 model II, manufactured by Tosoh Corp.
Conditions for measurement:
  Column temperature: 40° C.
  Solvent: Tetrahydrofuran
  Flow rate: 0.35 ml/minute
  Standard: Monomodal polystyrene
  Sample: A 0.2% by mass tetrahydrofuran solution, in terms of the amount of the resin solids, which has been subjected to filtration using a microfilter (100 μl)

Production Example 1

Production of an Acryl-Modified Alkyd Resin (A-1) Water Dispersion

A flask having a stirring rod, a temperature sensor, a condenser, and a dropping funnel was charged with 420 parts by mass of dehydrated castor oil fatty acid and 486 parts by mass of industrial xylene. While allowing dry nitrogen to flow into the flask, the resultant mixture was stirred and heated to 130° C. Then, a mixture of 305 parts by mass of isobutyl methacrylate, 255 parts by mass of methacrylic acid, 203 parts by mass of styrene, 38 parts by mass of tertiarybutyl peroxybenzoate ("PERBUTYL Z", manufactured by NOF Corporation), and 38 parts by mass of industrial xylene was added dropwise from the dropping funnel over 3 hours. The resultant mixture was further stirred at 130° C. for 2 hours, and, after making sure that the viscosity was not changed, the mixture was cooled to 60° C. The mixture was diluted with methyl ethyl ketone so that the resin solids content became 60% by mass, obtaining an acrylic resin intermediate (X-1) solution. The acrylic resin intermediate (X-1) had an oil length of 35, an acid value of 205.1 mg KOH/g, a number average molecular weight (Mn) of 1,400, and a weight average molecular weight (Mw) of 7,000.

A flask having a stirring rod, a temperature sensor, and a rectifying tube was charged with 390 parts by mass of tall oil fatty acid, 840 parts by mass of linseed oil, 518 parts by mass of pentaerythritol, 70 parts by mass of para-tertiarybutyl-benzoic acid, 104 parts by mass of polyoxyethylene glycol ("PEG #4000", manufactured by NOF Corporation), 675 parts by mass of phthalic anhydride, and 0.2 parts by mass of lithium hydroxide. While allowing dry nitrogen to flow into the flask, the resultant mixture was stirred and heated to 210 to 230° C. to perform a reaction. At a point in time when the acid value became 25.7 mg KOH/g, the reaction was terminated to obtain an alkyd resin intermediate (Y-1) having an oil length of 50, a hydroxyl value of 75.2 mg KOH/g, a number average molecular weight (Mn) of 1,700, and a weight average molecular weight (Mw) of 6,900.

The above-obtained alkyd resin intermediate (Y-1) was cooled to 80° C., and then 2,355 parts by mass of the acrylic resin intermediate (X-1) solution was added, and the resultant mixture was heated to 160° C. and the organic solvent was distilled off under reduced pressure conditions, and then the mixture was heated to 200° C. to perform a reaction for 3 hours. The resultant reaction mixture was cooled to 80° C., and diluted with methyl ethyl ketone so that the resin solids content became 80% by mass, obtaining an acryl-modified alkyd resin (A-1) solution. The acryl-modified alkyd resin (A-1) had an oil length of 46, an acid value of 55.8 mg KOH/g, a number average molecular weight (Mn) of 2,200, and a weight average molecular weight (Mw) of 27,600.

A flask having a stirring rod, a temperature sensor, and a dropping funnel was charged with 300 parts by mass of the acryl-modified alkyd resin (A-1) solution, and, while allowing dry nitrogen to flow into the flask, the solution was stirred and heated to 50° C. 19.3 parts by mass of triethylamine was added and then, while cooling to room temperature, 550 parts by mass of ion-exchanged water was added dropwise to the resultant mixture over 3 hours. The organic solvent was distilled off under reduced pressure conditions, and ion-exchanged water was further added to obtain an acryl-modified alkyd resin (A-1) water dispersion having a resin solids content of 30% by mass.

Production Example 2

Production of an Acryl-Modified Alkyd Resin (A-2) Water Dispersion

A flask having a stirring rod, a temperature sensor, and a rectifying tube was charged with 388 parts by mass of tall oil fatty acid, 840 parts by mass of linseed oil, 477 parts by mass of pentaerythritol, 17 parts by mass of para-tertiarybutyl-benzoic acid, 103 parts by mass of polyoxyethylene glycol ("PEG #4000", manufactured by NOF Corporation), 759 parts by mass of phthalic anhydride, and 0.2 parts by mass of lithium hydroxide. While allowing dry nitrogen to flow into the flask, the resultant mixture was stirred and heated to 210 to 230° C. to perform a reaction. At a point in time when the acid value became 33.3 mg KOH/g, the reaction was terminated to obtain an alkyd resin intermediate (Y-2) having an oil length of 46, a hydroxyl value of 81.0 mg KOH/g, a number average molecular weight (Mn) of 1,900, and a weight average molecular weight (Mw) of 13,800.

The above-obtained alkyd resin intermediate (Y-2) was cooled to 80° C., and then 1,970 parts by mass of the acrylic resin intermediate (X-1) solution was added, and the resultant mixture was heated to 160° C. and the solvent was distilled off under reduced pressure conditions, and then the mixture was heated to 200° C. to perform a reaction for 3 hours. The resultant reaction mixture was cooled to 80° C., and diluted with methyl ethyl ketone so that the resin solids content became 70% by mass, obtaining an acryl-modified alkyd resin (A-2) solution. The acryl-modified alkyd resin (A-2) had an oil length of 45, an acid value of 62.3 mg KOH/g, a number average molecular weight (Mn) of 1,600, and a weight average molecular weight (Mw) of 86,100.

A flask having a stirring rod, a temperature sensor, and a dropping funnel was charged with 300 parts by mass of the acryl-modified alkyd resin (A-2) solution, and, while allowing dry nitrogen to flow into the flask, the solution was stirred and heated to 50° C. 18.8 parts by mass of triethylamine was added and then, while cooling to room temperature, 550 parts by mass of ion-exchanged water was added dropwise to the resultant mixture over 3 hours. The organic solvent was distilled off under reduced pressure conditions, and ion-exchanged water was further added to obtain an acryl-modified alkyd resin (A-2) water dispersion having a resin solids content of 30% by mass.

Production Example 3

Production of an Acryl-Modified Alkyd Resin (A-3) Water Dispersion

A flask having a stirring rod, a temperature sensor, and a dropping funnel was charged with 1,500 parts by mass of the acryl-modified alkyd resin (A-1) solution (resin solids content: 80% by mass) and 0.13 parts by mass of a urethane-forming reaction catalyst ("NEOSTANN U-830", manufactured by Nitto Kasei Co., Ltd.), and, while allowing dry nitrogen to flow into the flask, the resultant mixture was stirred and heated to 60° C. Then, 60.0 parts by mass of isophorone diisocyanate was charged and the resultant mixture was heated to 70 to 90° C. to perform a reaction. At a point in time when the isocyanate group content became 0.05% by mass or less, cooling was started, and methyl ethyl ketone was added to obtain an acryl-modified alkyd resin (A-3) solution having a resin solids content of 70% by mass. The acryl-modified alkyd resin (A-3) had an acid value of 50.6 mg KOH/g, a number average molecular weight (Mn) of 2,000, and a weight average molecular weight (Mw) of 95,600.

A flask having a stirring rod, a temperature sensor, and a dropping funnel was charged with 300 parts by mass of the acryl-modified alkyd resin (A-3) solution, and, while allowing dry nitrogen to flow into the flask, the solution was stirred and heated to 50° C. 19.2 parts by mass of triethylamine was charged and then, while cooling to room temperature, 550 parts by mass of ion-exchanged water was added dropwise to the resultant mixture over 3 hours. The organic solvent was distilled off under reduced pressure conditions, and ion-exchanged water was further added to obtain an acryl-modified alkyd resin (A-3) water dispersion having a resin solids content of 30% by mass.

Production Example 4

Production of a (Meth)Acryloyl Group-Containing Compound (B-1) Water Dispersion 1,076 parts by mass of methyl ethyl ketone was charged into a pressure flask having a stirring rod, a temperature sensor, a condenser, and a dropping funnel, and heated to 90° C. under pressurizing conditions. A mixture of 850 parts by mass of methyl methacrylate, 200 parts by mass of 2-hydroxyethyl acrylate, 912 parts by mass of methoxy polyethylene glycol acrylate ("NK Ester AM-130G", manufactured by Shin-Nakamura Chemical Co., Ltd.), 150 parts by mass of methacrylic acid, and 8.0 parts by mass of tertiarybutyl (2-ethylhexanoyl) peroxide ("PERBUTYL O", manufactured by NOF Corporation) was added dropwise from the dropping funnel over 4 hours. After completion of the addition, 1.0 part by mass of ditertiarybutyl peroxide ("PERBUTYL D", manufactured by NOF Corporation) was charged, and the resultant mixture was subjected to reaction under pressurizing conditions at 120° C. for 3 hours to obtain an intermediate having a weight average molecular weight (Mw) of 12,400, an acid value of 13 mg KOH/g, and a hydroxyl value of 48 mg KOH/g.

A flask having a stirring rod, a temperature sensor, and a condenser was charged with 66 parts by mass of isophorone diisocyanate, 1.0 part by mass of 2,6-ditertiarybutyl-4-methylphenol ("BHT SWANOX", manufactured by Seiko Chemical Co., Ltd.), 0.1 parts by mass of methoquinone, and 0.02 parts by mass of a urethane-forming reaction catalyst ("NEOSTANN U-830", manufactured by Nitto Kasei Co., Ltd.), and, while allowing dry nitrogen to flow into the flask, the resultant mixture was stirred and heated to 60° C. Then, 241 parts by mass of "ARONIX M-305", manufactured by Toagosei Co., Ltd. (mixture of pentaerythritol triacrylate and pentaerythritol tetraacrylate; hydroxyl value: 117 mg KOH/g) was charged and the resultant mixture was heated to 70 to 90° C. to perform a reaction. At a point in time when the isocyanate group content became 1 to 1.2% by mass, 160 parts by mass of the above-obtained intermediate was added, and further the resultant mixture was subjected to reaction. At a point in time when the isocyanate group content became 0.10% or less, cooling was started, and the mixture was cooled to 50° C. 2.0 parts by mass of triethylamine was charged and then, while cooling to room temperature, 550 parts by mass of ion-exchanged water was added dropwise to the resultant mixture over 3 hours. The organic solvent was distilled off under reduced pressure conditions, and ion-exchanged water was further added to obtain a (meth) acryloyl group-containing compound (B-1) water dispersion having a resin solids content of 40% by mass.

Example 1

Production of an Active-Energy-Ray-Curable Aqueous Resin Composition (1)

Into a flask having a stirring rod, a temperature sensor, and a dropping funnel were charged 357 parts by mass of the acryl-modified alkyd resin (A-2) solution (resin solids content: 70% by mass) 50 parts by mass of "ARONIX M-305", manufactured by Toagosei Co., Ltd. (mixture of pentaerythritol triacrylate and pentaerythritol tetraacrylate; hydroxyl value: 117 mg KOH/g), and 200 parts by mass of "NK Ester A-400", manufactured by Shin-Nakamura Chemical Co., Ltd. (polyethylene glycol diacrylate), and, while allowing dry nitrogen to flow into the flask, the resultant mixture was stirred and heated to 50° C. 28.1 parts by mass of triethylamine was charged and then, while cooling to room temperature, 1,060 parts by mass of ion-exchanged water was added dropwise to the resultant mixture over 3 hours. The organic solvent was distilled off under reduced pressure conditions, and ion-exchanged water was further added to obtain an active-energy-ray-curable aqueous resin composition (1) having a resin solids content of 30% by mass.

Example 2

Production of an Active-Energy-Ray-Curable Aqueous Resin Composition (2)

A flask having a stirring rod, a temperature sensor, and a dropping funnel was charged with 643 parts by mass of the acryl-modified alkyd resin (A-2) solution (resin solids content: 70% by mass) and 50 parts by mass of "ARONIX M-350", manufactured by Toagosei Co., Ltd. (ethylene oxide-modified trimethylolpropane triacrylate), and, while allowing dry nitrogen to flow into the flask, the resultant mixture was stirred and heated to 50° C. 78.1 parts by mass of dimethylaminopropylacrylamide was charged and then, while cooling to room temperature, 974 parts by mass of ion-exchanged water was added dropwise to the resultant mixture over 3 hours. The organic solvent was distilled off under reduced pressure conditions, and ion-exchanged water was further added to obtain an active-energy-ray-curable aqueous resin composition (2) having a resin solids content of 30% by mass.

Example 3

Production of an Active-Energy-Ray-Curable Aqueous Resin Composition (3)

A flask having a stirring rod, a temperature sensor, and a dropping funnel was charged with 357 parts by mass of the acryl-modified alkyd resin (A-2) solution (resin solids content: 70% by mass), 75 parts by mass of "ARONIX M-305", manufactured by Toagosei Co., Ltd. (mixture of pentaerythritol triacrylate and pentaerythritol tetraacrylate; hydroxyl value: 117 mg KOH/g), and 175 parts by mass of "NK Ester A-400", manufactured by Shin-Nakamura Chemical Co., Ltd. (polyethylene glycol diacrylate), and, while allowing dry nitrogen to flow into the flask, the resultant mixture was stirred and heated to 50° C. 14.0 parts by mass of triethylamine and 21.7 parts by mass of dimethylaminopropylacrylamide were charged and then, while cooling to room temperature, 1,060 parts by mass of ion-exchanged water was added dropwise to the resultant mixture over 3 hours. The organic solvent was distilled off under reduced pressure conditions, and ion-exchanged water was further added to obtain an active-energy-ray-curable aqueous resin composition (3) having a resin solids content of 30% by mass.

Example 4

Production of an Active-Energy-Ray-Curable Aqueous Resin Composition (4)

A flask having a stirring rod, a temperature sensor, and a condenser was charged with 357 parts by mass of the acryl-modified alkyd resin (A-3) solution (resin solids content: 70% by mass), 50 parts by mass of "ARONIX M-305", manufactured by Toagosei Co., Ltd. (mixture of pentaerythritol triacrylate and pentaerythritol tetraacrylate; hydroxyl value: 117 mg KOH/g), and 200 parts by mass of "NK Ester A-400", manufactured by Shin-Nakamura Chemical Co., Ltd. (polyethylene glycol diacrylate), and the resultant mixture was heated to 50° C. 23.3 parts by mass of triethylamine was charged and then, while cooling to room temperature, 1,060 parts by mass of ion-exchanged water was added dropwise to the resultant mixture over 3 hours. The organic solvent was distilled off under reduced pressure conditions, and ion-exchanged water was further added to obtain an active-energy-ray-curable aqueous resin composition (4) having a resin solids content of 30% by mass.

Examples 5 to 18

The components were blended in the formulation shown in Tables 1 to 3, and the resin solids content was adjusted to 30% by mass by appropriately adding ion-exchanged water, producing an active-energy-ray-curable aqueous resin composition.

Details of the components shown in the tables are as follows.
(Meth)acryloyl group-containing compound (B-2): "NK Ester A-400" (polyethylene glycol diacrylate), manufactured by Shin-Nakamura Chemical Co., Ltd.
Photopolymerization initiator: "IRGACURE 500", manufactured by BASF Japan Ltd.
Fluorine additive: "MEGAFACE F-477", manufactured by DIC Corporation
Silicone additive: "BYK-345", manufactured by BYK Japan K.K.
Polycarbodiimide resin: "CARBODILITE V-02-L2", manufactured by Nisshinbo Chemical Inc.
Oxazoline group-containing resin: "EPOCROS WS-500", manufactured by Nippon Shokubai Co., Ltd.
Production of a Reflector The above-obtained active-energy-ray-curable aqueous resin composition was applied onto a plastic substrate by air spray coating. The applied composition was dried at 80° C. for 10 minutes, and then irradiated with an ultraviolet light at 1,500 mJ/cm$^2$ using a high-pressure mercury lamp at 80 W/cm to form an undercoat layer. The undercoat layer had a thickness in the range of 15 to 25 μm. Then, an aluminum deposited layer having a thickness of 100 nm was formed on the surface of the undercoat layer using a vacuum deposition apparatus to prepare a reflector. Reflectors 1 to 3 respectively using the three types of plastic substrates shown below were prepared.

Reflector 1: A PPS (polyphenylene sulfide) plate was used as a substrate.
Reflector 2: A BMC (bulk molding compound) plate was used as a substrate.
Reflector 3: An ABS (acrylonitrile-butadiene-styrene copolymer resin) plate was used as a substrate.
Production of a Coated Plate The above-obtained active-energy-ray-curable aqueous resin composition was applied onto a polycarbonate substrate by air spray coating. The applied composition was dried at 80° C. for 10 minutes, and then irradiated with an ultraviolet light at 1,500 mJ/cm$^2$ using a high-pressure mercury lamp at 80 W/cm to form a coating film layer. The coating film layer had a thickness in the range of 15 to 25 μm.
Initial Evaluation of a Reflector—Appearance—

With respect to the reflectors 1 to 3, the appearance was evaluated in accordance with the criteria shown below. The results of the evaluation are shown in Tables 1 to 3.

"A": The reflector is smooth, and poor appearance, such as "whitening", "rainbow", "cracks", or "blister", is not observed.

"B": Poor appearance, such as "whitening", "rainbow", "cracks", or "blister", is observed in only part of the reflector.

"C": Poor appearance, such as "whitening", "rainbow", "cracks", or "blister", is observed in the whole of the reflector.

Initial Evaluation of a Reflector—Adhesion to a Substrate—

With respect to the reflectors 1 to 3, the adhesion to a substrate was evaluated by the method described below. The results are shown in Tables 1 to 3.

On the aluminum deposited layer side of each of the reflectors 1 to 3, cuts were made using a cutting knife in a pattern of 10×10 lattices spaced at intervals of 2 mm to form 100 lattices each being 4 mm$^2$. Then, a test was conducted in which a pressure-sensitive adhesive tape was placed on the lattices of cuts and then quickly peeled, and the adhesion to a substrate was evaluated in accordance with the example of ASTM D3359.

"5B": The removed area after the test is 0%.
"4B": The removed area after the test is less than 5%.
"3B": The removed area after the test is 5 to less than 15%.
"2B": The removed area after the test is 15 to less than 35%.
"2B": The removed area after the test is 35 to less than 65%.
"OB": The removed area after the test is 65% or more.

TABLE 1

|  | Example 5 | Example 6 | Example 7 | Example 8 | Example 9 |
|---|---|---|---|---|---|
| Acryl-modified alkyd resin (A-1) water dispersion [Parts by mass (in terms of the amount of the resin solids)] | 50 |  |  |  | 70 |
| Acryl-modified alkyd resin (A-2) water dispersion [Parts by mass (in terms of the amount of the resin solids)] |  | 50 |  |  |  |
| Acryl-modified alkyd resin (A-3) water dispersion [Parts by mass (in terms of the amount of the resin solids)] |  |  | 50 |  |  |
| Active-energy-ray-curable aqueous resin composition (4) [Parts by mass (in terms of the amount of the resin solids)] |  |  |  | 90 |  |
| (Meth)acryloyl group-containing compound (B-1) water dispersion [Parts by mass (in terms of the amount of the resin solids)] | 50 | 50 | 50 |  | 30 |
| Polycarbodiimide resin [Parts by mass (in terms of the amount of the resin solids)] |  |  |  | 10 |  |
| Photopolymerization initiator [Parts by mass] | 4 | 4 | 4 | 4 | 4 |
| Fluorine additive [Part by mass] | 0.3 | 0.3 | 0.3 | 0.3 | 0.3 |
| Evaluation of appearance (Reflector 1 - Initial) | A | A | A | A | A |
| Evaluation of appearance (Reflector 2 - Initial) | A | A | A | A | A |
| Evaluation of appearance (Reflector 3 - Initial) | A | A | A | A | A |
| Adhesion to substrate (Reflector 1 - Initial) | 5B | 5B | 5B | 5B | 5B |
| Adhesion to substrate (Reflector 2 - Initial) | 5B | 5B | 5B | 5B | 4B |
| Adhesion to substrate (Reflector 3 - Initial) | 5B | 5B | 5B | 5B | 5B |

TABLE 2

|  | Example 10 | Example 11 | Example 12 | Example 13 | Example 14 |
|---|---|---|---|---|---|
| Acryl-modified alkyd resin (A-2) water dispersion [Parts by mass (in terms of the amount of the resin solids)] | 70 |  |  |  |  |
| Acryl-modified alkyd resin (A-3) water dispersion [Parts by mass (in terms of the amount of the resin solids)] |  | 70 |  |  |  |
| Active-energy-ray-curable aqueous resin composition (2) [Parts by mass (in terms of the amount of the resin solids)] |  |  | 100 | 80 |  |
| Active-energy-ray-curable aqueous resin composition (3) [Parts by mass (in terms of the amount of the resin solids)] |  |  |  |  | 100 |
| (Meth)acryloyl group-containing compound (B-1) water dispersion [Parts by mass (in terms of the amount of the resin solids)] | 30 | 30 |  |  |  |
| (Meth)acryloyl group-containing compound (B-2) [Parts by mass] |  |  |  | 20 |  |
| Photopolymerization initiator [Parts by mass] | 4 | 4 | 4 | 4 | 4 |
| Fluorine additive [Part by mass] | 0.3 | 0.3 |  |  |  |
| Silicone additive [Part by weight] |  |  | 0.3 | 0.3 | 0.3 |

TABLE 2-continued

|  | Example 10 | Example 11 | Example 12 | Example 13 | Example 14 |
|---|---|---|---|---|---|
| Evaluation of appearance (Reflector 1 - Initial) | A | A | A | A | A |
| Evaluation of appearance (Reflector 2 - Initial) | A | A | A | A | A |
| Evaluation of appearance (Reflector 3 - Initial) | A | A | A | A | A |
| Adhesion to substrate (Reflector 1 - Initial) | 5B | 5B | 5B | 5B | 5B |
| Adhesion to substrate (Reflector 2 - Initial) | 4B | 5B | 5B | 5B | 5B |
| Adhesion to substrate (Reflector 3 - Initial) | 5B | 5B | 5B | 5B | 5B |

TABLE 3

|  | Example 15 | Example 16 | Example 17 | Example 18 |
|---|---|---|---|---|
| Active-energy-ray-curable aqueous resin composition (1) [Parts by mass (in terms of the amount of the resin solids)] | 100 |  |  |  |
| Active-energy-ray-curable aqueous resin composition (2) [Parts by mass (in terms of the amount of the resin solids)] |  | 50 |  |  |
| Active-energy-ray-curable aqueous resin composition (4) [Parts by mass (in terms of the amount of the resin solids)] |  |  | 90 | 100 |
| (Meth)acryloyl group-containing compound (B-1) water dispersion [Parts by mass (in terms of the amount of the resin solids)] |  | 50 |  |  |
| Oxazoline group-containing resin [Parts by mass (in terms of the amount of the resin solids)] |  |  | 10 |  |
| Photopolymerization initiator [Parts by mass] | 4 | 4 | 4 | 4 |
| Fluorine additive [Part by mass] | 0.3 |  | 0.3 | 0.3 |
| Silicone additive [Part by weight] |  | 0.3 |  |  |
| Evaluation of appearance (Reflector 1 - Initial) | A | A | A | A |
| Evaluation of appearance (Reflector 2 - Initial) | A | A | A | A |
| Evaluation of appearance (Reflector 3 - Initial) | A | A | A | A |
| Adhesion to substrate (Reflector 1 - Initial) | 5B | 5B | 5B | 5B |
| Adhesion to substrate (Reflector 2 - Initial) | 5B | 5B | 5B | 5B |
| Adhesion to substrate (Reflector 3 - Initial) | 5B | 5B | 5B | 5B |

Evaluation of Heat Resistance of a Reflector—Appearance—

With respect to Examples 5 to 14, the reflector 3 was allowed to stand in a hot-air dryer at 80° C. for 24 hours, and then the appearance of the resultant reflector 3 was evaluated in accordance with the criteria shown below. The results are shown in Table 4.

"A": The reflector is smooth, and poor appearance, such as "whitening", "rainbow", "cracks", or "blister", is not observed.

"B": Poor appearance, such as "whitening", "rainbow", "cracks", or "blister", is observed in only part of the reflector.

"C": Poor appearance, such as "whitening", "rainbow", "cracks", or "blister", is observed in the whole of the reflector.

TABLE 4

|  | Example 5 | Example 6 | Example 7 | Example 8 | Example 9 |
|---|---|---|---|---|---|
| Evaluation of appearance (Reflector 3 - 80° C., 24 hr) | B | B | B | B | B |

|  | Example 10 | Example 11 | Example 12 | Example 13 | Example 14 |
|---|---|---|---|---|---|
| Evaluation of appearance (Reflector 3 - 80° C., 24 hr) | B | B | B | B | A |

Evaluation of Heat Resistance of a Reflector-Adhesion to a Substrate

With respect to Examples 5 to 16, the adhesion of each of the heat-treated reflectors 1 and 3 to a substrate was evaluated by the method described below. The results are shown in Table 5.

The reflector 1 which had been allowed to stand in a hot-air dryer at 230° C. for 24 hours and the reflector 3 which had been allowed to stand in a hot-air dryer at 80° C. for 24 hours were prepared.

On the aluminum deposited layer side of each reflector, cuts were made using a cutting knife in a pattern of 10×10 lattices spaced at intervals of 2 mm to form 100 lattices each being 4 mm². Then, a test was conducted in which a pressure-sensitive adhesive tape was placed on the lattices of cuts and then quickly peeled, and the adhesion to a substrate was evaluated in accordance with the example of ASTM D3359.

"5B": The removed area after the test is 0%. "4B": The removed area after the test is less than 5%. "3B": The removed area after the test is 5 to less than 15%.

"2B": The removed area after the test is 15 to less than 35%.

"1B": The removed area after the test is 35 to less than 65%.

"0B": The removed area after the test is 65% or more.

TABLE 5

|  | Example 5 | Example 6 | Example 7 | Example 8 | Example 9 | Example 10 |
|---|---|---|---|---|---|---|
| Adhesion to substrate (Reflector 1 - 230° C., 24 hr) | 3B | 4B | 4B | 2B | 3B | 4B |
| Adhesion to substrate (Reflector 3 - 80° C., 24 hr) | 2B | 3B | 3B | 3B | 2B | 2B |

|  | Example 11 | Example 12 | Example 13 | Example 14 | Example 15 | Example 16 |
|---|---|---|---|---|---|---|
| Adhesion to substrate (Reflector 1 - 230° C., 24 hr) | 3B | 4B | 4B | 5B | 5B | 4B |
| Adhesion to substrate (Reflector 3 - 80° C., 24 hr) | 2B | 4B | 5B | 4B | 5B | 5B |

Evaluation of Acid Resistance of a Coating Film

An acid resistance test for coating film layer was conducted by placing a plastic container filled with a 1 N aqueous sulfuric acid solution on the coating film layer of the above-obtained coated plate and allowing it to stand in an environment at 25° C. for 24 hours. The state of the coating film layer after the test was visually inspected, and evaluated in accordance with the criteria shown below. The coated plates in all Examples 1 to 18 had rating "A".

"A": No change is found in the tested coating film layer.
"B": Whitening or blister is caused in part of the tested coating film layer.
"C": Whitening or blister is caused in the whole of the tested coating film layer.

Evaluation of Alkali Resistance of a Coating Film

With respect to Examples 5 to 8 and 15 to 17, an alkali resistance test for coating film layer was conducted by placing a plastic container filled with a 0.1 N aqueous sodium hydroxide solution on the coating film layer of the coated plate and allowing it to stand in an environment at 25° C. for 24 hours. The state of the coating film layer after the test was visually inspected, and evaluated in accordance with the criteria shown below. The results are shown in Table 6.

"A": No change is found in the tested coating film layer.
"B": Whitening or blister is caused in part of the tested coating film layer.
"C": Whitening or blister is caused in the whole of the tested coating film layer.

TABLE 6

|  | Example 5 | Example 6 | Example 7 | Example 8 |
|---|---|---|---|---|
| Alkali resistance (Coated plate) | B | B | B | A |

|  | Example 15 | Example 16 | Example 17 |
|---|---|---|---|
| Alkali resistance (Coated plate) | B | B | A |

Evaluation of Solvent Resistance of a Coating Film

With respect to Examples 5 to 8, 16, and 17, a rubbing test was conducted in which felt that had been immersed in methyl ethyl ketone was rubbed 10 times at a distance of 10 cm against the coating film layer side of the coated plate while pressing the felt against the plate with a load of 500 g. Haze values of the coated plate before and after the test were measured, and evaluated in accordance with the criteria shown below. All the coated plates had rating "A".

"A": A difference between the haze values before and after the test is less than 1.
"B": A difference between the haze values before and after the test is 1 to less than 3.
"C": A difference between the haze values before and after the test is 3 or more.

The invention claimed is:

1. An active-energy-ray-curable aqueous resin composition comprising an acryl-modified alkyd resin (A) and a (meth)acryloyl group-containing compound (B) as essential components,
    wherein the acryl-modified alkyd resin (A) is a reaction product of, as reaction raw materials, an acrylic resin intermediate (X) having an acid value in the range of 50 to 300 mg KOH/g and a weight average molecular weight (Mw) in the range of 1,000 to 50,000 and an alkyd resin intermediate (Y) having an oil length of 10 or more and a weight average molecular weight (Mw) in the range of 1,000 to 100,0000.

2. The active-energy-ray-curable aqueous resin composition according to claim 1, wherein the acryl-modified alkyd resin (A) is produced using a polyhydric alcohol having a (poly)oxyethylene structure as an essential reaction raw material.

3. The active-energy-ray-curable aqueous resin composition according to claim 2, wherein the proportion of the polyhydric alcohol having a (poly)oxyethylene structure is in the range of 0.1 to 50% by mass, based on the total mass of the reaction raw materials for the acryl-modified alkyd resin (A).

4. The active-energy-ray-curable aqueous resin composition according to claim 1, wherein the acrylic resin intermediate (X) has an oil length of 10 or more.

5. The active-energy-ray-curable aqueous resin composition according to claim 1, wherein the mass ratio of the acryl-modified alkyd resin (A) to the (meth)acryloyl group-containing compound (B) [(A)/(B)] is 20/80 to 80/20.

6. An undercoat agent for an inorganic-material thin film, comprising the active-energy-ray-curable aqueous resin composition according to claim 1.

7. A coating film comprising the undercoat agent according to claim 6.

8. A molded article having an undercoat layer comprising the undercoat agent according to claim 6.

* * * * *